United States Patent [19]

Kakimoto

[11] Patent Number: 5,471,614
[45] Date of Patent: Nov. 28, 1995

[54] DATABASE SYSTEM CONCURRENCY CONTROL APPARATUS USING TIMESTAMPS AND PROCESSING TIME ESTIMATION

[75] Inventor: Mitsuru Kakimoto, Kanagawa, Japan

[73] Assignee: Kabushiki Kaisha Toshiba, Kawasaki, Japan

[21] Appl. No.: 596,704

[22] Filed: Oct. 10, 1990

[30] Foreign Application Priority Data

Oct. 17, 1989 [JP] Japan ..................... 1-268048

[51] Int. Cl.$^6$ ..................... G06F 9/38
[52] U.S. Cl. ............. 395/650; 395/600; 395/425; 364/281.4; 364/DIG. 1; 364/569
[58] Field of Search ................... 395/600, 650, 395/425, 325

[56] References Cited

U.S. PATENT DOCUMENTS

| | | | |
|---|---|---|---|
| 3,702,006 | 10/1972 | Page | 444/1 |
| 4,567,566 | 1/1986 | Araya et al. | 364/554 |
| 4,644,542 | 2/1987 | Aghili et al. | 371/22 |
| 4,648,023 | 3/1987 | Powell | 364/156 |
| 4,663,723 | 5/1987 | Umeda | 364/492 |
| 4,794,521 | 12/1988 | Ziegler et al. | 395/425 |
| 4,805,107 | 2/1989 | Kieckhafer et al. | 395/650 |
| 4,823,310 | 4/1989 | Grand | 395/600 |
| 4,852,001 | 7/1989 | Tsushima et al. | 364/401 |
| 4,980,532 | 12/1990 | Morishita | 219/69.13 |
| 5,101,340 | 3/1992 | Nonaka et al. | 395/650 |
| 5,121,494 | 6/1992 | Dias et al. | 395/600 |
| 5,155,695 | 6/1990 | Stein | 364/569 |

*Primary Examiner*—Thomas G. Black
*Assistant Examiner*—Peter Y. Wang
*Attorney, Agent, or Firm*—Foley & Lardner

[57] ABSTRACT

A method and an apparatus for the concurrency control in the database system, in which each transaction can be executed properly according to its scale. In the apparatus, a processing time for each transaction is estimated, a timestamp appropriate for each transaction is determined from the estimated processing time and a current time, and a concurrency control is carried out according to the determined timestamps for the transactions to be executed concurrently.

11 Claims, 4 Drawing Sheets

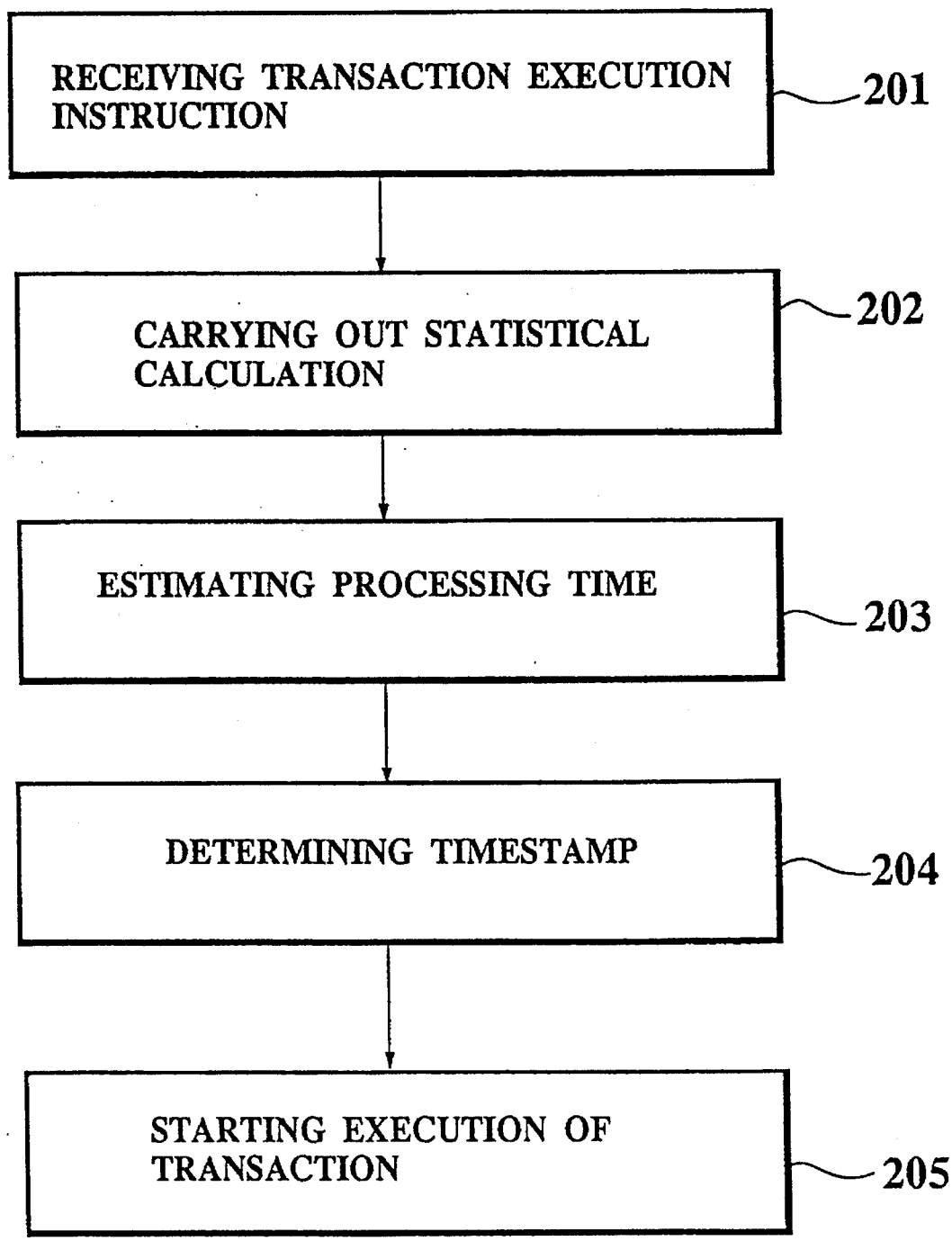

DATABASE SYSTEM CONCURRENCY CONTROL APPARATUS USING TIMESTAMPS AND PROCESSING TIME ESTIMATION

BACKGROUND OF THE INVENTION

1. Field of the Invention

The present invention relates to a method and an apparatus for concurrency control in a database system, in which timestamps are attached to a plurality of transactions in order to control the order of their executions.

2. Description of the Background Art

It is custom nowadays to utilize on-line processing using a computer for management of bank accounts, management of airplane seat reservations, and other such processings.

In the computer, various information such as that on each bank account or that on a state of seat reservations is stored in a form of a database. In such a database system, operations such as a transfer to a bank account and a confirmation of a seat reservation are performed as a job in which a computer accesses the database. Such a job in the database system has somewhat different characteristics from ordinary computer jobs, so that it is customarily called a transaction in order to make this distinction clear.

Now, in a computer system of an ample capacity used for such a database system, it is usual that a plurality of transactions are concurrently executed in order to improve its processing efficiency. In such a case, it is known that if an access to the database by each transaction is allowed freely, the consistency among the data can be destroyed. To prevent such trouble, a database manager for a database system is normally equipped with a scheduler which orders the read and write instructions issued by a plurality of transactions in such a manner as to maintain the consistency among the data. Such an operation by the scheduler is called a concurrency control.

There are various methods proposed for the concurrency control in the database system, of which two most popular methods being a so called two phase lock method and a timestamp ordering method. In particular, the timestamp ordering method is suitable for parallel processings, so that a dispersed database system can easily be realized with this method, as the schedulers for different sites of such a dispersed database system have no need to communicate each other in the timestamp ordering method.

In the timestamp ordering method, every transaction Ti is attached with a timestamp ts(Ti) which indicate a time this transaction Ti has started, such that this timestamp ts(Ti) is attached to each one of the read and write instructions issued by this transaction Ti in a course of its execution. Here, with respect to a particular data item x in the database, a timestamp $max\_w[x]$ of the last write instruction which had given a latest renewal of this data item, and a timestamp $max\_r[x]$ of the last read instruction which had read this data item most recently are recorded in the database system. The concurrency control is achieved by allowing an access to the data item x in response to a read instruction issued by the transaction Ti only when a condition:

$$ts(Ti) > max\_w[x] \tag{1}$$

can be satisfied. Likewise, an access to the data item x in response to a write instruction issued by the transaction Ti is allowed only when a condition:

$$ts(Ti) > max\_w[x], \text{ and } ts(Ti) > max\_r[x] \tag{2}$$

can be satisfied. In a case these conditions are not satisfied, the transaction Ti is rolled back to obtain a new timestamp and repeat the process all over again from the beginning. Thus, the instructions for accessing the same data item are ordered according to their timestamps.

However, such a timestamp ordering method has been associated with the following drawback.

In general, a scale of each transaction, i.e., a number of data items to be accessed and a time required for completing the data processing, is not necessarily uniform. For example, in a case of a banking system, in addition to an ordinary calculation processing such as a transfer to each bank account, there is also a so called information processing in which global information concerning a part or a whole of the database system is collected, in order to be utilized for instance in determining a strategy for system operation. Thus, the calculation processing requires only a small number of accesses, whereas the information processing requires a much greater number of accesses, which in some case amounts to accessing the entire database system.

Now, in such a large scale transaction of an information processing, even if the execution of the transaction can be performed without interruption due to interference from the other transaction, the time at which the execution is completed can be significantly later than its timestamp which is equal to the time at which the execution had started. In such a case, the aforementioned conditions (1) and (2) for the read and write instructions become progressively more difficult to satisfy toward the end of the execution, so that the larger transaction is less likely to be completed.

SUMMARY OF THE INVENTION

It is therefore an object of the present invention to provide a method and an apparatus for concurrency control in the database system, in which each transaction can be executed properly according to its scale.

According to one aspect of the present invention there is provided an apparatus for attaching timestamps to transactions to be executed concurrently in a database system in which a concurrency control is carried out according to the timestamps of the transactions, comprising: means for estimating a processing time for each transaction; and means for determining a timestamp appropriate for each transaction from the processing time estimated by the estimating means and a current time, and attaching the determined timestamp to each transaction.

According to another aspect of the present invention there is provided a method of attaching timestamps to transactions to be executed concurrently in a database system in which a concurrency control is carried out according to the timestamps of the transactions, comprising the steps of: estimating a processing time for each transaction; and determining a timestamp appropriate for each transaction from the processing time estimated by the estimating means and a current time, and attaching the determined timestamp to said each transaction.

Other features and advantages of the present invention will become apparent from the following description taken in conjunction with the accompanying drawings.

BRIEF DESCRIPTION OF THE DRAWINGS

FIG. 4 is a flow chart for the operation of the apparatus of FIG. 3.

DETAILED DESCRIPTION OF THE PREFERRED EMBODIMENTS

Figure 1:
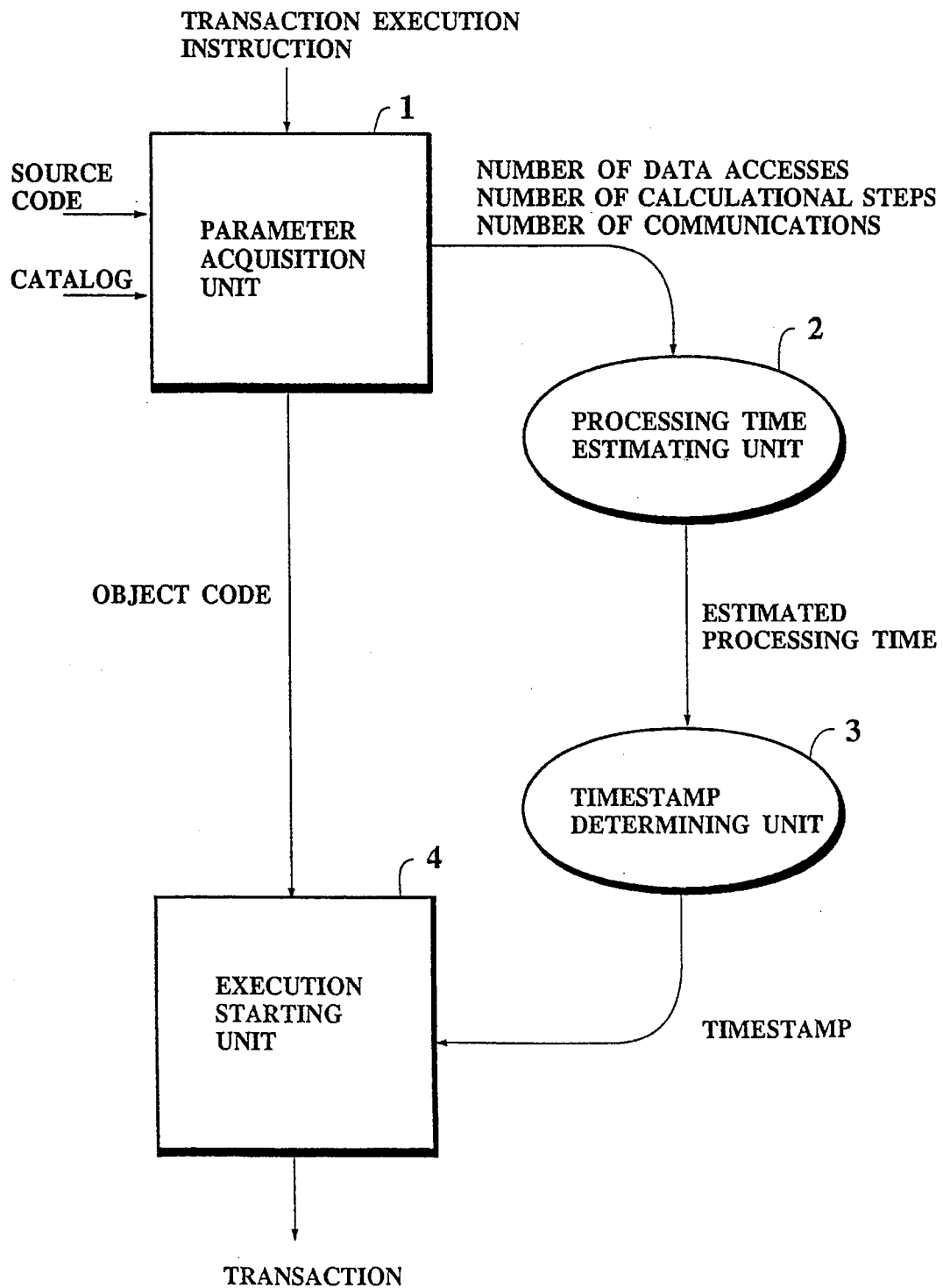
FIG. 1 is a schematic block diagram of a first embodiment of an apparatus for concurrency control according to the present invention.

Referring now to FIG. 1, a first embodiment of an apparatus for a concurrency control according to the present invention will be described.

This apparatus comprises a parameter acquisition unit 1 for collecting parameters necessary in assessing a processing time of a given transaction, a processing time estimating unit 2 for assessing the processing time of the transaction in accordance with the parameters collected by the parameter acquisition unit 1, a timestamp determining unit 3 for determining a timestamp appropriate for the transaction in accordance with the processing time estimated by the processing time estimating unit 2, and an execution starting unit 4 for attaching the timestamp determined by the timestamp determining unit 3 to the transaction, and starting the execution of the transaction.

In this embodiment, the timestamp is not just a time at which the execution of the transaction starts as in the conventional concurrency control, but it also account for the estimated processing time such that the timestamp attached to the transaction becomes greater than a conventional timestamp attached to the transaction in a conventional concurrency control. In general, the greater timestamp ensures the better possibility that the aforementioned conditions (1) and (2) are satisfied for read and write instruction issued by the transaction. Thus, by accounting for the estimated processing time, this apparatus enables the concurrency control reflecting a desired level of priority for each transaction, such that even a large scale transaction can be executed appropriately.

Here, the processing time of the given transaction depends on a number of fundamental operations involved in the execution of the transaction, i.e., a number of accesses to be made to the data in the database, a number of steps required to process the accessed data, and a number of communications to be made. Information related to these factors is collected by the parameter acquisition unit 1 by utilizing source codes of the programs describing the operations involved in the transaction, and a catalog of the database.

The processing time estimating unit 2 estimates the processing time in accordance with the parameters collected by the parameter acquisition unit 1, either theoretically or empirically. For example, the processing time T can be estimated by a formula:

$$T = ta \cdot a + ts \cdot s + tc \cdot c \quad (3)$$

where ta is a time required for making an access to one data item in the database, ts is a time required for processing one step of calculation, tc is a time required for making one communication, a is a number of accesses to data item involved in the transaction, s is a number of steps of calculations involved in the transaction, c is a number of communications involved in the transaction.

The timestamp determining unit 3 determines the timestamp such that a greater timestamp is given to a transaction of larger scale, so as to give a higher priority level to such a large scale transaction. For example, the timestamp ts(Ti) to be given to the transaction Ti can be determined by a formula:

$$ts(Ti) = \text{current time} + A \cdot \text{estimated processing time} \quad (4)$$

where $0 \leq A \leq 1$ is a coefficient predetermined in accordance with a desired level of the priority to be awarded to the large scale transaction in the database system. Thus, with A=0, the timestamp ts(Ti) is identical to that used in a conventional concurrency control, whereas with A=1, a higher priority level can be awarded to a transaction of a larger scale.

Figure 2:
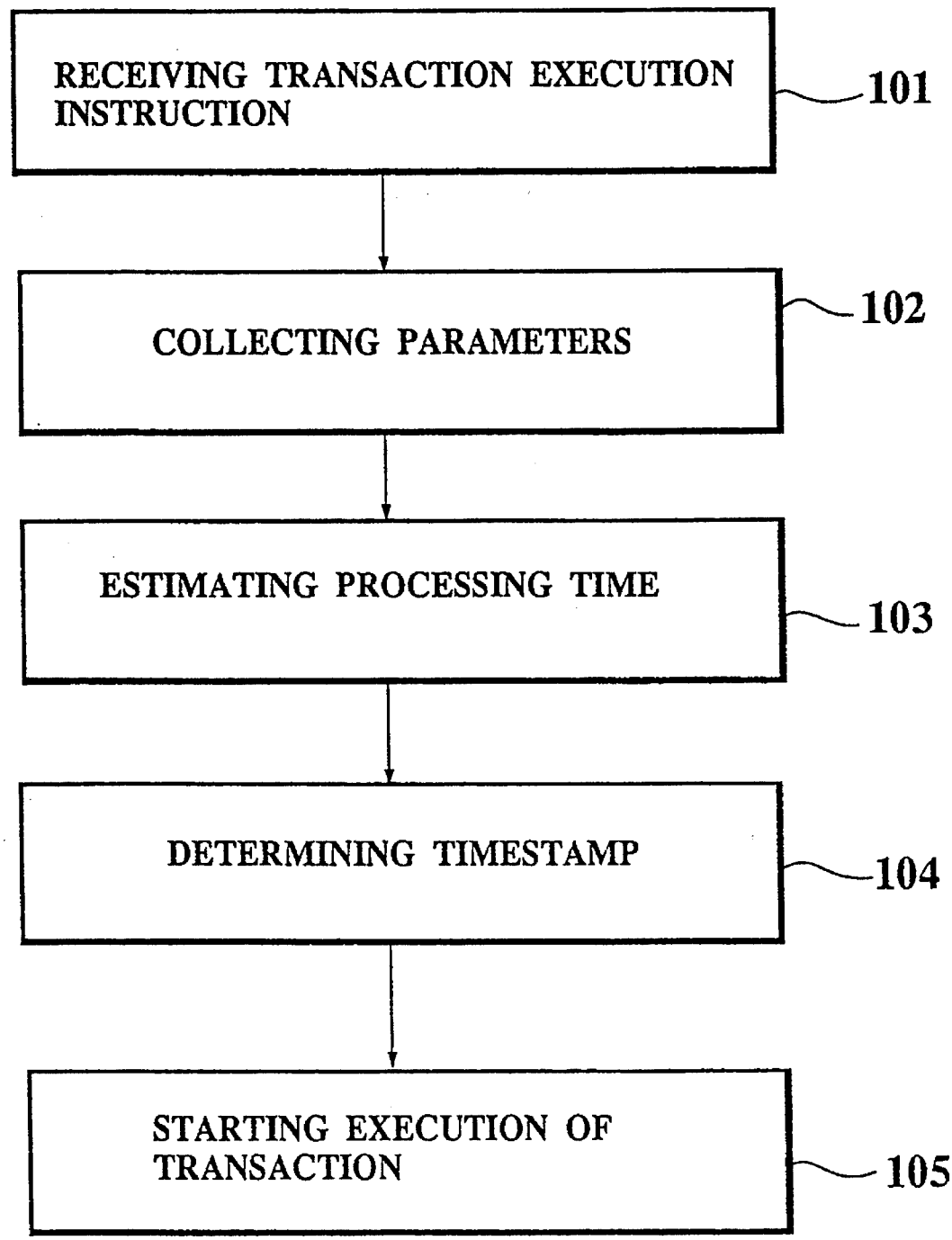
FIG. 2 is a flow chart for the operation of the apparatus of FIG. 1.

Thus, the operation of this apparatus proceeds according to the flow chart of FIG. 2, as follows.

First, at the step 101, a transaction execution instruction for a new transaction Ti is received by the parameter acquisition unit 1. Then, in response, the parameter acquisition unit 1 collects the parameters from the source codes of the programs for this transaction Ti and the catalog of the database as described above at the step 102. Next, at the step 103, the processing time estimating unit 3 estimates the processing time T in accordance with the parameters collected by the parameter acquisition unit 1 using the aforementioned formula (3) for example. Then, at the step 104, the timestamp determining unit 3 determines the appropriate timestamp ts(Ti) in accordance with the processing time T estimated by the processing time estimating unit 2 by using the aforementioned formula (4) for example. Finally, at the step 105, the timestamp determined by the timestamp determining unit 3 is given to the execution starting unit 4 which attaches this timestamp to the transaction Ti and starts the execution of the transaction Ti.

Thus, according to this embodiment, it is possible to perform the concurrency control in the database system, in which each transaction can be executed properly according to its scale.

Figure 3:
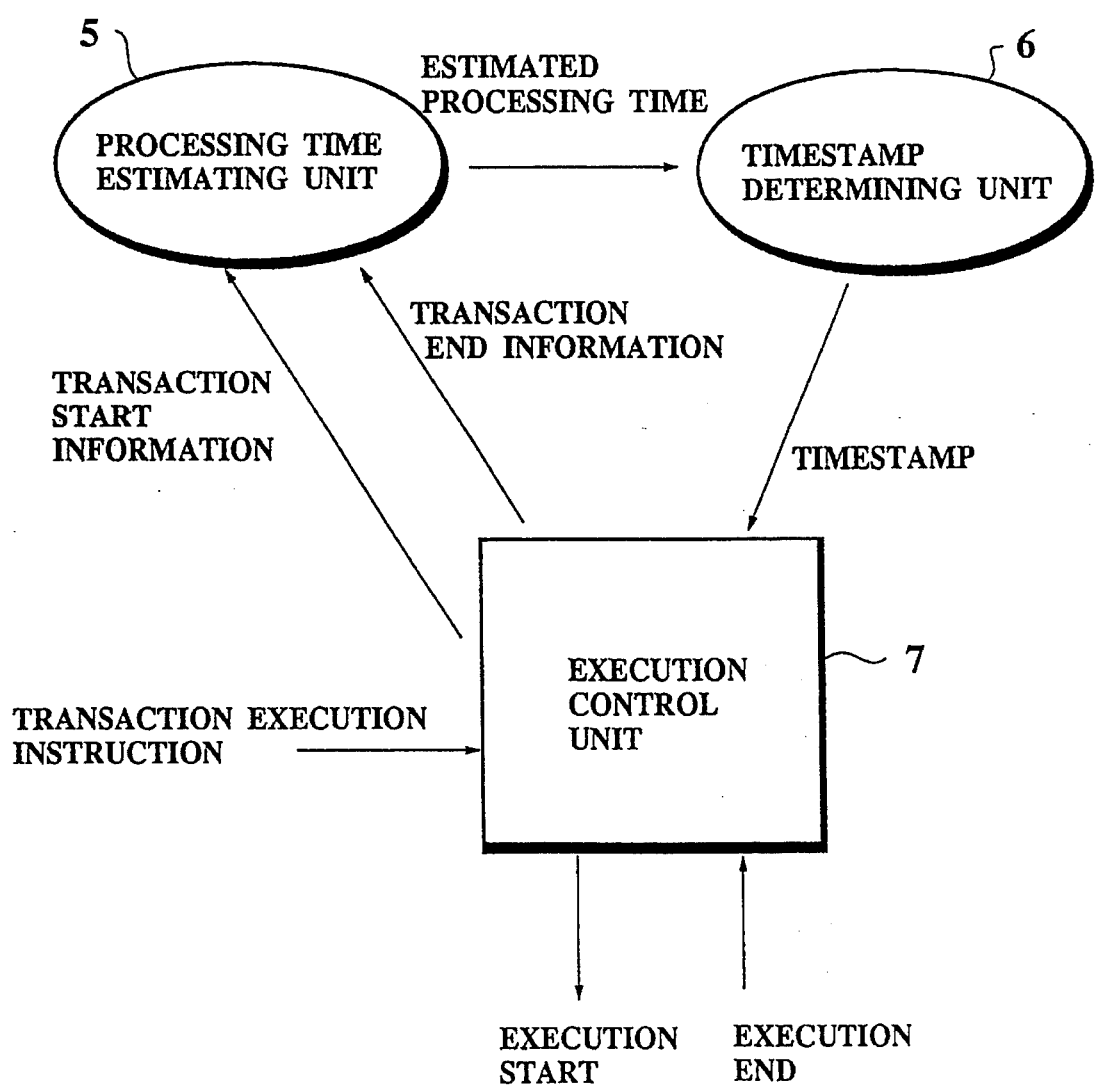
FIG. 3 is a schematic block diagram of a second embodiment of an apparatus for concurrency control according to the present invention.

Referring now to FIG. 3, a second embodiment of an apparatus for a concurrency control according to the present invention will be described.

In this embodiment, the apparatus comprises a processing time estimating unit 5 which monitors an actual processing time of a transaction and estimates the processing time of the transaction, a timestamp determining unit 6 which determines the timestamp appropriate for the transaction in accordance with the processing time estimated by the processing time estimating unit 5, and an execution control unit 7.

In this embodiment, the transactions are classified in advance into a plurality of classes according to the processing time required for each transaction, and the processing time estimating unit 5 estimates the processing time not for each transaction but for a class to which each transaction belongs. For example, in a case of a banking system, the transactions can be classified into those belonging to a class of calculation processing which require a shorter processing time, and those belonging to a class of information processing which require a longer processing time.

Here, the processing time estimating unit 5 collects information relating to an actual starting time and an actual ending time for each transaction from the execution control unit 7 every time a transaction is executed, and estimates the processing time for a new transaction according to the actual processing time taken in the past by the other transactions belonging to the same class as this new transaction.

Thus, the operation of this apparatus proceeds according to the flow chart of FIG. 4, as follows.

First, at the step 201, a transaction execution instruction for a new transaction Ti is received by the execution control unit 7. Then, in response, the processing time estimating unit 5 carries out a statistical calculation on records of the processing time for the other transactions of the same class as this transaction Ti collected up to this point at the step 202 and, at the step 203, estimates the processing time T in accordance with this statistical calculation. Then, and at the step 204, the timestamp determining unit 6 determines the appropriate timestamp ts(Ti) in accordance with the processing time T estimated by the processing time estimating unit 2 by using the aforementioned formula (4) for example, as in the previous embodiment. Finally, at the step 205, the timestamp determined by the timestamp determining unit 6 is given to the execution control unit 7 which attaches this timestamp to the transaction Ti and starts the execution of the transaction Ti.

Thus, according to this embodiment, it is also possible to perform the concurrency control in the database system, in which each transaction can be executed properly according to its scale.

Now, it is noted that the first embodiment described above ignores the fact that the parameters such as ta, ts, and tc appearing in the formula (3) are actually not constants but vary from transaction to transaction. Moreover, depending on the database system in which the concurrency control apparatus is incorporated, the collection of some of these parameters may turn out to be impossible. On the other hand, In the second embodiment, the classification of the transactions to be made in advance has a considerable influence on the effectiveness of the concurrency control.

To improve on these points, the second embodiment described above may be modified such that, instead of monitoring an actual processing time of a transaction, the processing time estimating unit 5 monitors an actual time for each fundamental operation, and estimates the processing time for a new transaction according to the aforementioned formula (3) by utilizing the actual time taken in the past by each of the fundamental operations involved in this new transaction.

Besides these, many modifications and variations of the above embodiments may be made without departing from the novel and advantageous features of the present invention. Accordingly, all such modifications and variations are intended to be included within the scope of the appended claims.

What is claimed is:

1. An apparatus for attaching timestamps to transactions to be executed concurrently in a database system in which a concurrency control is carried out according to the timestamps of the transactions, comprising:

means for estimating a processing time for each transaction;

means for determining a timestamp appropriate for each transaction from the processing time estimated by the estimating means and a current time at which the timestamp is determined; and means for attaching the determined timestamp to said each transaction such that concurrency control for execution of the transactions is carried out according to the attached timestamps.

2. The apparatus of claim 1, wherein the estimating means estimates the processing time in terms of a number of fundamental operations involved in each transaction.

3. The apparatus of claim 1, wherein the transactions are classified into a plurality of classes, and the estimating means estimates the processing time for said each transaction using records indicating a processing time taken by previously executed transactions belonging to a same class as said each transaction.

4. The apparatus of claim 1, wherein the estimating means estimates the processing time for said each transaction using records indicating an amount of time taken by fundamental operations involved in said each transaction when the fundamental operations were previously executed in a prior transaction.

5. The apparatus of claim 1, wherein the determining means determines each timestamp as a sum of the current time and a prescribed fraction of the processing time estimated by the estimating means.

6. A method of attaching timestamps to transactions to be executed concurrently in a database system in which a concurrency control is carried out according to the timestamps of the transactions, comprising the steps of:

estimating a processing time for each transaction;

determining a timestamp for each transaction from the processing time estimated by the estimating step and a current time at which the timestamp is determined; and attaching the determined timestamp to said each transactions such that concurrency control for execution of the transactions is carried out using the determined timestamps.

7. The method of claim 6, wherein at the estimating step the processing time is estimated in terms of a number of fundamental operations involved in each transaction.

8. The method of claim 6, wherein the transactions are classified into a plurality of classes, and wherein at the estimating step, the processing time for each transaction is estimated using records indicating a processing time taken by previously executed transactions belonging to a same class as said each transaction.

9. The method of claim 6, wherein at the estimating step the processing time for each transaction is estimated using records indicating a time taken by fundamental operations involved in said each transaction when the fundamental operations were previously executed in a prior transaction.

10. The method of claim 6, wherein at the determining steps each timestamp is determined as a sum of the current time and a prescribed fraction of the processing time estimated by the estimating step.

11. A method of concurrently executing transactions in a database system, comprising the steps of:

estimating a processing time for each transaction;

determining a timestamp for said each transaction from the processing time estimated by the estimating step and a current time at which the timestamp is determined;

attaching the determined timestamp to said each transaction; and carrying out a concurrency control according to the timestamps of the transactions.

* * * * *